US009405591B2

(12) United States Patent
Bhanage et al.

(10) Patent No.: US 9,405,591 B2
(45) Date of Patent: Aug. 2, 2016

(54) METHOD FOR DYNAMIC LOAD BALANCING IN CAMPUS DEPLOYMENTS

(71) Applicant: Aruba Networks, Inc., Sunnyvale, CA (US)

(72) Inventors: Gautam D. Bhanage, Sunnyvale, CA (US); Venkatesh Kannan, Sunnyvale, CA (US); Partha Narasimhan, Saratoga, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 194 days.

(21) Appl. No.: 14/067,802

(22) Filed: Oct. 30, 2013

(65) Prior Publication Data

US 2015/0120910 A1 Apr. 30, 2015

(51) Int. Cl.
*G06F 15/16* (2006.01)
*G06F 9/50* (2006.01)
*H04L 29/08* (2006.01)
*H04W 24/02* (2009.01)

(52) U.S. Cl.
CPC .............. *G06F 9/5083* (2013.01); *H04L 67/10* (2013.01); *H04W 24/02* (2013.01)

(58) Field of Classification Search
CPC ... H04L 43/0876; H04L 67/10; G06F 9/5083; H04W 24/02
See application file for complete search history.

(56) References Cited

U.S. PATENT DOCUMENTS

| 7,805,517 | B2 * | 9/2010 | Shim et al. | 709/227 |
| 8,082,348 | B1 * | 12/2011 | Averbuj et al. | 709/227 |
| 8,185,909 | B2 * | 5/2012 | Sigal et al. | 718/105 |
| 8,201,176 | B2 * | 6/2012 | Tatsubori et al. | 718/102 |
| 2009/0099898 | A1 * | 4/2009 | Ehrman et al. | 705/9 |
| 2010/0094981 | A1 * | 4/2010 | Cordray et al. | 709/222 |
| 2010/0299419 | A1 * | 11/2010 | Ramankutty et al. | 709/221 |
| 2014/0010150 | A1 * | 1/2014 | Agarwal et al. | 370/328 |

\* cited by examiner

*Primary Examiner* — Ario Etienne
*Assistant Examiner* — Thorne E Waugh
(74) *Attorney, Agent, or Firm* — Hewlett Packard Enterprise Patent Department

(57) ABSTRACT

A method is described for dynamically assigning tasks to entities of different types within a network system based on preferences to perform the tasks on particular entities and/or network/device conditions. This ability to dynamically assign processing of tasks between disparate devices in a network system provides a more efficient network configuration and utilization of resources while not compromising throughput, overall network security, and/or network flexibility.

20 Claims, 5 Drawing Sheets

METHOD FOR DYNAMIC LOAD BALANCING IN CAMPUS DEPLOYMENTS

TECHNICAL FIELD

The present disclosure relates to dynamically assigning tasks to different types or classes of devices in a network system based on preference scores associated with performing the tasks on each device.

BACKGROUND

Over the last decade, there has been a substantial increase in the use and deployment of wireless client devices, from dual-mode smartphones to tablets capable of operating in accordance with a particular Institute of Electrical and Electronics Engineers (IEEE) standard. With "wireless" becoming the de-facto medium for connectivity among users, it has become increasingly important for network systems to intelligently manage connections.

In some environments, multiple access points and network controllers may be deployed to handle clients and customers in various areas. Each of these access points and network controllers may independently perform operations or tasks for associated client devices. For example, in a tunnel mode, a network controller may perform encryption/decryption tasks for an associated client device. In contrast, in a de-tunnel mode, an access point may perform these encryption/decryption tasks for the client device. Similarly, Media Access Control Service Data Unit (MSDU) processing tasks (e.g., encapsulation, decapsulation, and aggregation), multicast optimization (e.g., dynamic multicast-unicast conversion and rate control), and other types of tasks may be performed by either an access point or a network controller in a network decision. Traditionally, the decision of which device performs each task is pre-determined and remains static during operation of the network system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

Figure 1:
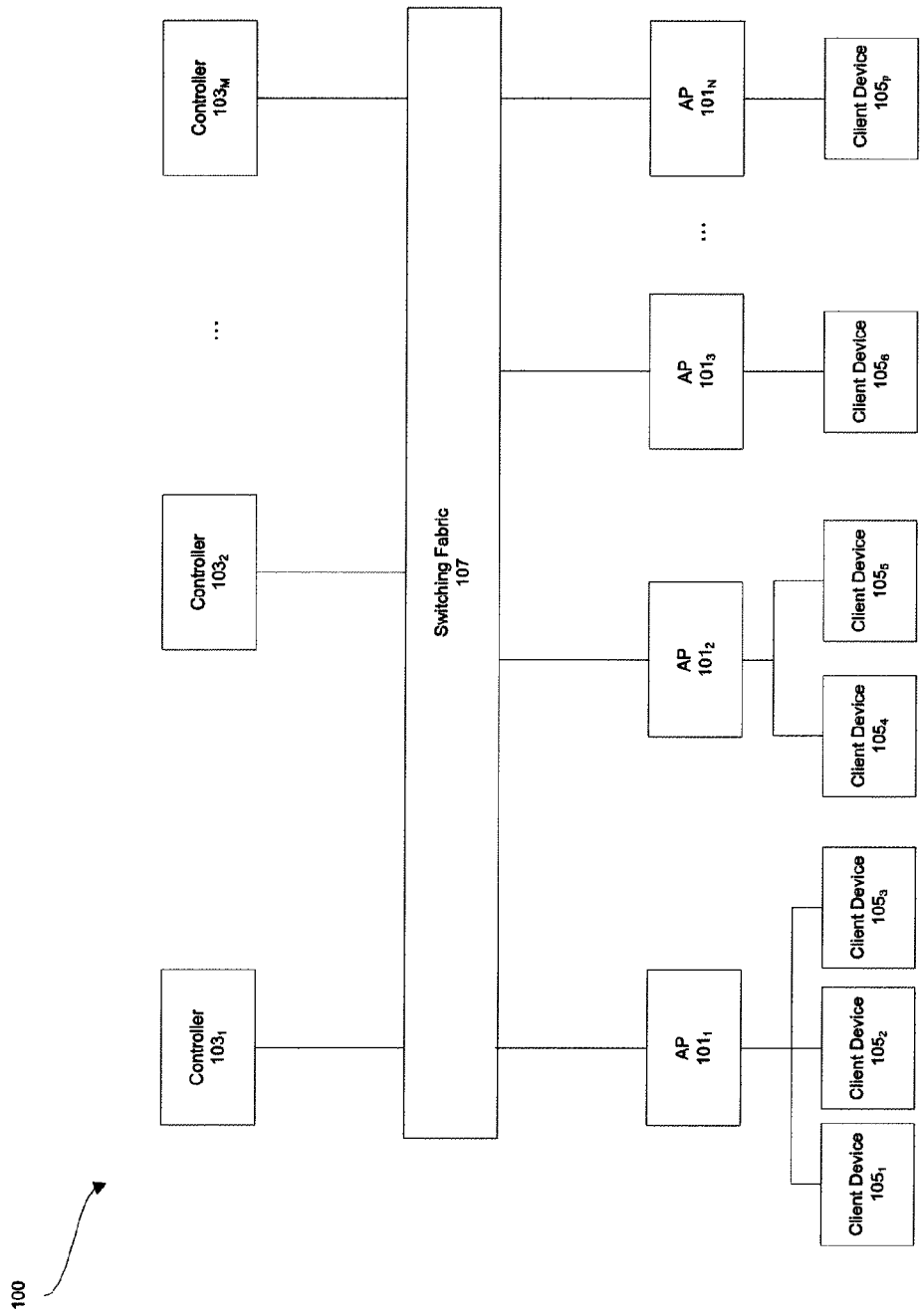
FIG. 1 shows a block diagram example of a network system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

Herein, certain terminology is used to describe features for embodiments of the disclosure. For example, the term "digital device" generally refers to any hardware device that includes processing circuitry running at least one process adapted to control the flow of traffic into the device. Examples of digital devices include a computer, a tablet, a laptop, a desktop, a netbook, a server, a web server, an authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a television peripheral, a printer, a mobile handset, a smartphone, a personal digital assistant "PDA", a wireless receiver and/or transmitter, an access point, a base station, a communication management device, a router, a switch, and/or a controller.

It is contemplated that a digital device may include hardware logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory computer-readable storage medium (e.g., a programmable circuit; a semiconductor memory such as a volatile memory and/or random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Herein, the terms "logic" (or "logic unit") are generally defined as hardware and/or software. For example, as hardware, logic may include a processor (e.g., a microcontroller, a microprocessor, a CPU core, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, source code, object code, a shared library/dynamic load library, or one or more instructions. These software modules may be stored in any type of a suitable non-transitory storage medium, or transitory computer-readable transmission medium (e.g., electrical, optical, acoustical or other form of propagated signals such as carrier waves, infrared signals, or digital signals).

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

FIG. 1 shows a block diagram example of a network system 100 in accordance with one or more embodiments. The network system 100, as illustrated in FIG. 1, is a digital system that may include a plurality of digital devices such as one or more access points $101_1$-$101_N$, one or more network controllers $103_1$-$103_M$, and one or more client devices $105_1$-$105_P$. The client devices $105_1$-$105_P$ may be connected or otherwise associated with the access points $101_1$-$101_N$ through corresponding wireless connections. The access points $101_1$-$101_N$ and the network controllers $103_1$-$103_M$ may be connected through the switching fabric 107 through wired and/or wireless connections. Each element of the network system 100 will be described below by way of example. In one or more embodiments, the network system 100 may include more or less devices than the devices illustrated in FIG. 1, which may be connected to other devices within the network system 100 via wired and/or wireless mediums. For example, in other embodiments, the network system 100 may include additional access points 101, network controllers 103, and/or client devices 105 than those shown in FIG. 1.

Figure 2:
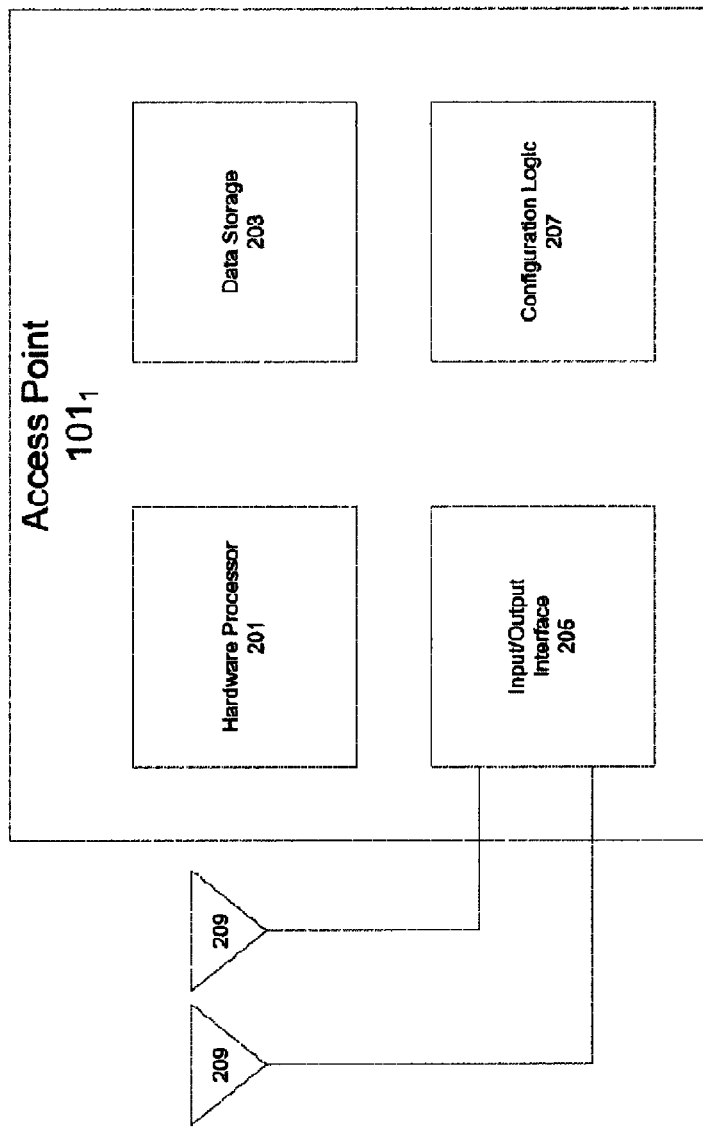
FIG. 2 shows a block diagram example of an access point in accordance with one or more embodiments.

The access points $101_1$-$101_N$ may be any device that can associate with the client devices $105_1$-$105_P$ to transmit and receive data over wireless channels. Each of the access points $101_1$-$101_N$ may be configured to operate one or more virtual access points (VAPs) that allow each of the access points $101_1$-$101_N$ to be segmented into multiple broadcast domains. In one embodiment, each VAP may apply different wireless settings to separate sets of the client devices $105_1$-$105_P$ associated with the access points $101_1$-$101_N$. In one embodiment, the access points $101_1$-$101_N$ may correspond to a network device such as a wireless access point, a switch, a router, or any combination thereof. FIG. 2 shows a component diagram of the access point $101_1$ according to one embodiment. In other embodiments, the access points $101_2$-$101_N$ may include similar or identical components to those shown and described in relation to the access point $101_1$.

As shown in FIG. 2, the access point $101_1$ may comprise one or more of: a hardware processor 201, data storage 203, an input/output (I/O) interface 205, and device configuration logic 207. Each of these components of the access point $101_1$ will be described in further detail below.

The data storage 203 of the access point $101_1$ may include a fast read-write memory for storing programs and data during performance of operations/tasks and a hierarchy of persistent memory, such as Read Only Memory (ROM), Erasable Programmable Read Only Memory (EPROM) and/or Flash memory for example, for storing instructions and data needed for the startup and/or operation of the access point $101_1$. In one embodiment, the data storage 203 is a distributed set of data storage components. The data storage 203 may store data that is to be transmitted from the access point $101_1$ or data that is received by the access point $101_1$. For example, the data storage 203 of the access point $101_1$ may store data to be forwarded to the client devices $105_1$-$105_3$ or to one or more of the network controllers $103_1$-$103_M$.

In one embodiment, the I/O interface 205 corresponds to one or more components used for communicating with other devices (e.g., the client devices $105_1$-$105_P$, the network controllers $103_1$-$103_M$, and/or other access points $101_2$-$101_N$) via wired or wireless signals. The I/O interface 205 may include a wired network interface such as an IEEE 802.3 Ethernet interface and/or a wireless interface such as an IEEE 802.11 WiFi interface. The I/O interface 205 may communicate with the client devices $105_1$-$105_P$ and the network controllers $103_1$-$103_M$ over corresponding wireless channels in the system 100. In one embodiment, the I/O interface 205 facilitates communications between the access point $101_1$ and one or more of the network controllers $103_1$-$103_M$ through the switching fabric 107. In one embodiment, the switching fabric 107 includes a set of network components that facilitate communications between multiple devices. For example, the switching fabric 107 may be composed of one or more switches, routers, hubs, etc. These network components that comprise the switching fabric 107 may operate using both wired and wireless mediums.

In some embodiments, the I/O interface 205 may include one or more antennas 209 for communicating with the client devices $105_1$-$105_P$, the network controllers $103_1$-$103_M$, and/or other wireless devices in the network system 100. For example, multiple antennas 209 may be used for forming transmission beams to one or more of the client devices $105_1$-$105_P$ or the network controllers $103_1$-$103_M$ through adjustment of gain and phase values for corresponding antenna 209 transmissions. The generated beams may avoid objects and create an unobstructed path to the client devices $105_1$-$105_P$ and/or the network controllers $103_1$-$103_M$.

In one embodiment, the hardware processor 201 is coupled to the data storage 203 and the I/O interface 205. The hardware processor 201 may be any processing device including, but not limited to a MIPS/ARM-class processor, a microprocessor, a digital signal processor, an application specific integrated circuit, a microcontroller, a state machine, or any type of programmable logic array.

In one embodiment, the device configuration logic 207 includes one or more functional units implemented using firmware, hardware, software, or a combination thereof for configuring parameters associated with the access point $101_1$. In one embodiment, the device configuration logic 207 may be configured to allow the access point $101_1$ to associate with different client devices $105_1$-$105_P$.

As described above, the other access points $101_2$-$101_N$ may be similarly configured as described above in relation to access point $101_1$. For example, the access points $101_2$-$101_N$ may comprise a hardware processor 201, data storage 203, an input/output (I/O) interface 205, and device configuration logic 207 in a similar fashion as described above in relation to the access point $101_1$.

In one embodiment, the client devices $105_1$-$105_P$ may be any wireless or wired electronic devices capable of receiving and transmitting data over wired and wireless mediums. For example, the client devices $105_1$-$105_P$ may be one or more of personal computers, laptop computers, netbook computers, wireless music players, portable telephone communication devices, smart phones, tablets, and digital televisions. In one embodiment, the client devices $105_1$-$105_P$ are digital devices that include a hardware processor, memory hierarchy, and input/output (I/O) interfaces including a wired and/or wireless interface such as an IEEE 802.3 interface. In one embodiment, the configuration of the components within the client devices $105_1$-$105_P$ may be similar to those discussed above in relation to the access point $101_1$. In other embodiments, the client devices $105_1$-$105_P$ may include more or less components than those shown in FIG. 2 in relation to the access point $101_1$.

In one embodiment, the network controllers $103_1$-$103_M$ are digital devices that include a hardware processor, memory hierarchy, and input/output (I/O) interfaces including a wired and/or wireless interface such as an IEEE 802.3 interface. In one embodiment, the configuration of the components within the network controllers $103_1$-$103_M$ may be similar to those discussed above in relation to the access point $101_1$. In other embodiments, the network controllers $103_1$-$103_M$ may include more or less components than those shown in FIG. 2 in relation to the access point $101_1$.

In one embodiment, the network controllers $103_1$-$103_M$ may be any set of devices that assist the access points $101_1$-$101_N$ in performing network tasks and operations. For example, the network controllers $103_1$-$103_M$ may assist the access points $101_1$-$101_N$ to perform one or more of 1) encryption and decryption, 2) Media Access Control Service Data Unit (MACSDU) processing, and 3) multicast optimization. As will be described in greater detail below, the access points $101_1$-$101_N$ and the network controllers $103_1$-$103_M$ may share each of these tasks such that under a first set of conditions and preferences an access point 101 may perform a particular set of tasks while under a second set of conditions and preferences, a network controller 103 may perform this set of tasks. For example, under a first set of task preferences and load conditions on the access point $101_1$ and the network controller $103_1$, encryption and decryption tasks corresponding to the client device $105_1$ may be performed by the access point $101_1$. In contrast, under a second set of task preferences and load conditions on the access point $101_1$ and the network controller $103_1$, these encryption and decryption tasks corresponding to the client device $105_1$ may be performed by the network controller $103_1$. Accordingly, tasks may be selectively assigned and performed by access points 101 and network controllers 103 based on multiple variables (e.g., load conditions and task preferences). In some embodiments, the assignment of tasks between access points 101 and network controllers 103 may be further divided by numerous characteristics of the tasks, including 1) client device 105 identifiers, 2) Wi-Fi Multimedia (WMM) traffic type, 3) session identifiers, 4) application identifiers, 5) packet types, and 6) virtual access point identifiers. The process of assigning tasks to particular access points $101_1$-$101_N$ and network controllers $103_1$-$103_M$ will be described in greater detail below.

Figure 3:
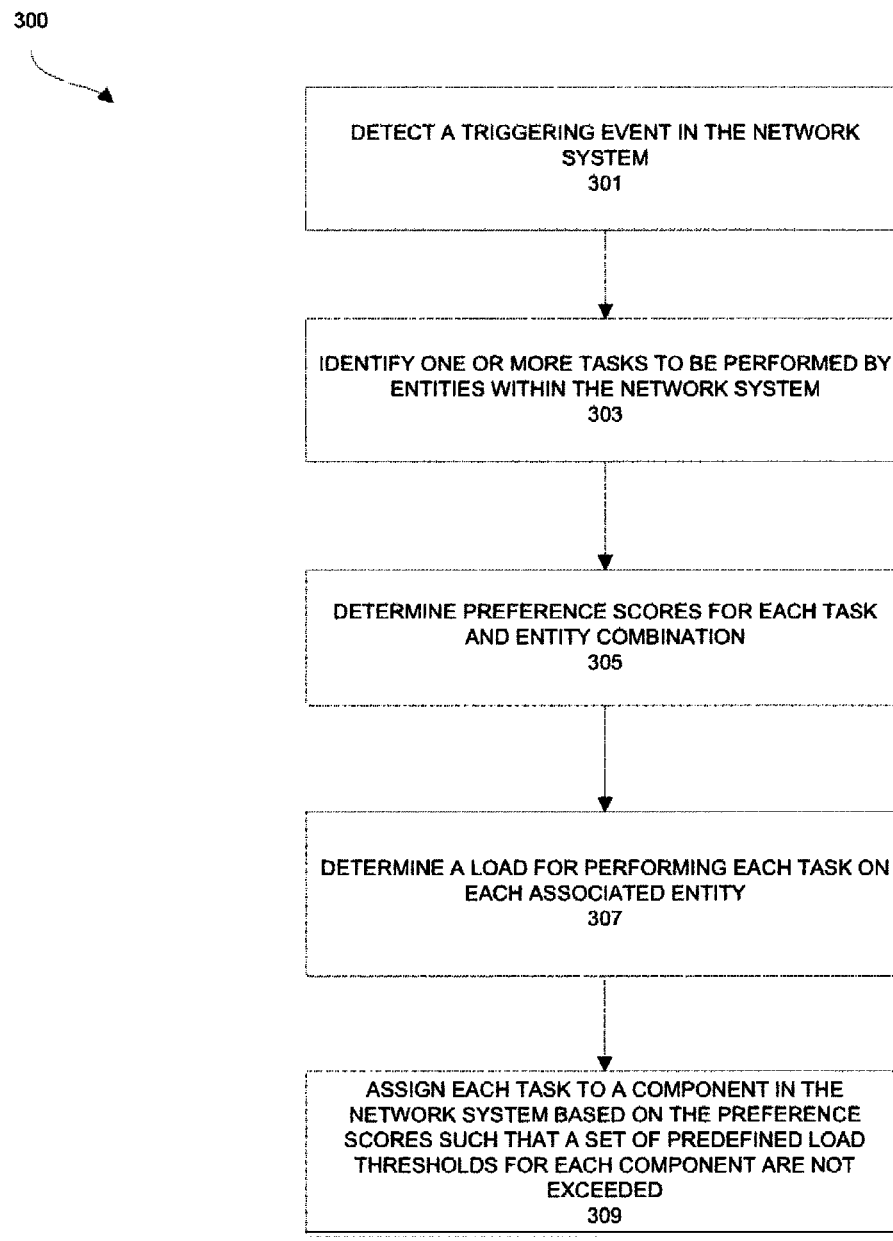
FIG. 3 shows a method for dynamically assigning tasks to entities of different types within the network system based on preferences to perform tasks on particular entities in accordance with one or more embodiments.

FIG. 3 shows a method 300 for dynamically assigning tasks to devices of different types within the network system 100 based on preferences to perform tasks on particular devices. For example, in one embodiment the decision to assign a particular set of tasks to either the access point $101_1$ or the network controller $103_1$ is based on 1) detected conditions on the access point $101_1$ and/or the network controller $103_1$ and/or 2) preferences to perform the tasks on either the access point $101_1$ or the network controller $103_1$.

It is understood that although assignment of tasks in the method 300 is discussed in relation to access points $101_1$-$101_N$ and network controller $103_1$-$103_M$, these sets of devices are merely illustrative. Accordingly, in other embodiments, assignment of tasks in the method 300 may be performed in relation to any set of dissimilar devices (i.e., devices of different type, model, or class).

The method 300 may be performed by one or more devices in the network system 100. For example, the method 300 may be performed by one or more of the network controllers $103_1$-$103_M$ in conjunction with one or more of the access points $101_1$-$101_N$ in the network system 100. In one embodiment, one of the network controllers $103_1$-$103_M$ may be designated as a master network controller in the network system 100 such that each operation of the method 300 is performed by this designated master network controller.

In one embodiment, the method 300 may commence at operation 301 with the detection of a triggering event in the network system 100. The triggering event may be, for example, 1) the detection of the memory load on a particular access point 101 or network controller 103 exceeding a predefined memory threshold and/or 2) the detection of the processor load on a particular access point 101 or network controller 103 exceeding a predefined processor threshold. In these embodiments, detection of memory or processor loads above predefined thresholds indicates over utilization of one or more of these entities. Accordingly, the method 300 may seek to re-assign particular tasks to alleviate this over-utilization of these entities and reduce potential bottlenecks. In one embodiment, the triggering event of operation 301 may be the detection of overall congestion or over-utilization of the network system 100 instead of congestion on a particular entity in the network system 100. Similar to the embodiments discussed above, the method 300 may seek to re-assign particular tasks to alleviate this congestion or over-utilization. In some embodiments, the triggering event of operation 301 may be the detection of manual inputs from a network administrator or the detection of the passage of a predefined amount of time (e.g., twelve hours). Accordingly, in these embodiments the method 300 may be manually initiated by a network administrator and/or automatically initiated at predefined intervals.

Following the detection of a triggering event at operation 301, operation 303 may identify t tasks ($t \geq 1$) that may be assigned/re-assigned to an access point 101 or a network controller 103 in the network system 100 (i.e., each of the t identified tasks may be either performed by an access point 101 or a network controller 103). For example, in a tunnel mode, the network controller $103_1$ may perform encryption and decryption operations for the client device $105_1$. However, in a de-tunnel mode, these encryption and decryption operations for the client device $105_1$ may be performed by the access point $101_1$. Accordingly, the encryption and decryption tasks of the client device $105_1$ may be identified at operation 303 since they may be performed by either an access point 101 or a network controller 103. Although described in relation to encryption and decryption tasks, in other embodiments other types of tasks may be identified at operation 303. For example, Media Access Control Service Data Unit (MSDU) processing (e.g., aggregation control, encapsulating, and decapsulating) and multicast optimization tasks may be identified as tasks at operation 303 since these tasks may be selectively performed by an access point 101 or a network controller 103 in the network system 100. As will be described below, the tasks identified at operation 303 will be examined for assignment to devices within the network system according to preference scores and/or network/device utilization characteristics.

In one embodiment, identifying tasks at operation 303 may be performed based on different levels of granularity. For example, tasks may be divided based on one or more of 1) client device 105 identifiers, 2) Wi-Fi Multimedia (WMM) traffic type, 3) session identifiers, 4) application identifiers, 5) packet types, and 6) virtual access point identifiers. For example, an encryption/decryption task k corresponding to client device $105_1$ may be identified separately from an encryption/decryption task j corresponding to client device $105_2$. In this example, tasks k and j corresponding to the client devices $105_1$ and $105_2$, respectively, may be separately assigned to an access point 101 or to a network controller 103 in the network system 100. Similarly, the tasks k and j may be sub-divided by traffic type such that each traffic type for each client device $105_1$ and $105_2$ is identified as a separate task at operation 303. In this fashion, tasks may be identified on a varied level of granularity. The level of division/granularity of tasks may be selected at operation 303 based on load constraints (e.g., processor and/or memory) of the network resource performing the method 300 (e.g., one of the network controllers $103_1$-$103_M$) and/or time constraints for the performance of the method 300. For example, when a high load is detected on the network resource performing the method 300, operation 303 may set the level of granularity for identifying tasks at a low level (e.g., division of tasks only by client device 105 identifiers). In contrast, when a low load is detected on the network resource performing the method 300, operation 303 may set the level of granularity for identifying tasks at a high level (e.g., division of tasks by client device 105 identifiers, WMM traffic type, and session identifiers). By varying the level of granularity for division of tasks, operation 303 ensures that the method 300 may be efficiently performed and is not impractically delayed by the complexity level in performing the method 300.

Following the identification of t tasks at operation 303, operation 305 determines preferences for each of the t tasks to be performed on an associated access point 101 and network controller 103. In the description that follows, for a task k in the set of t identified tasks, the preference to perform the task k by entity i (e.g., one of the access points $101_1$-$101_N$ or one of the network controllers $103_1$-$103_M$) is represented as P(i, k). In one embodiment, the preference score P(i,k) may be on a scale from one to ten, where ten indicates a high preference for task k to be performed by entity i while one indicates a low preference for task k to be performed by entity i. For example, a preference score of three may be set for encryption/decryption tasks to be performed by the network controller $103_1$ for the client device $105_1$ accessing a YouTube® website. In contrast, a preference score of ten may be set for encryption/decryption tasks to be performed by the network controller $103_1$ for the client device 105 accessing corporate email services. In this example, access to corporate email is viewed as a more sensitive operation in comparison to access to YouTube®. Accordingly, the network controller $103_1$ has a high preference to perform encryption/decryption tasks for corporate email services (i.e., operate in a tunnel mode) to ensure access to the corporate email services is secure. However, access to streaming videos (e.g., access to a YouTube® website) may be considered less sensitive and accordingly access to these services may be performed in a de-tunnel mode.

In one embodiment, each of these preference scores (e.g., P(i,k)) may be determined by a network administrator or an element within the network system 100. For example, one or more of the network controllers $103_1$-$103_M$ and the access points $101_1$-$101_N$ may indicate a preference for a task k to be performed by that particular entity. These preference scores may be cultivated based on historic usage trends (i.e., through direct analysis of historic usage data, machine learning based on historic usage data, and/or other techniques), preferences indicated by a user of a client device 105, and/or a network administrator. In one embodiment, default preference score values may be provided for common scenarios. These default preference score values may thereafter be modified by a network administrator or an automated system.

Following determination of preference scores for each of the t identified tasks to be performed by one or more of the entities within the network system 100, operation 307 determines an estimated load on each entity that may potentially perform each of the t identified tasks. In one embodiment, the estimated load on an entity i for a task k includes an estimated memory utilization load M(k) and/or an estimated processor utilization load L(k) to be incurred by the entity i if the task k is assigned to be performed by the entity i. For example, an estimated processor load L(k) in Floating-point Operations Per Second (FLOPS) may be determined at operation 307 for each of the t tasks and each entity that may potentially perform each of the t tasks. These estimates may be determined based on previously seen similar types of traffic on the particular entity within the network system 100, current measurements of processor utilization load L(k) or memory utilization load M(k) on the entity i, and/or correlations between processor utilization load L(k) or memory utilization load M(k) with other metrics (e.g., correlations between the number of packets sent by the entity i and processor utilization load L(k) for the entity i). In one embodiment, the memory load M(k) may be calculated based on a table which scales in proportion to the processor load L(k).

Figure 4:
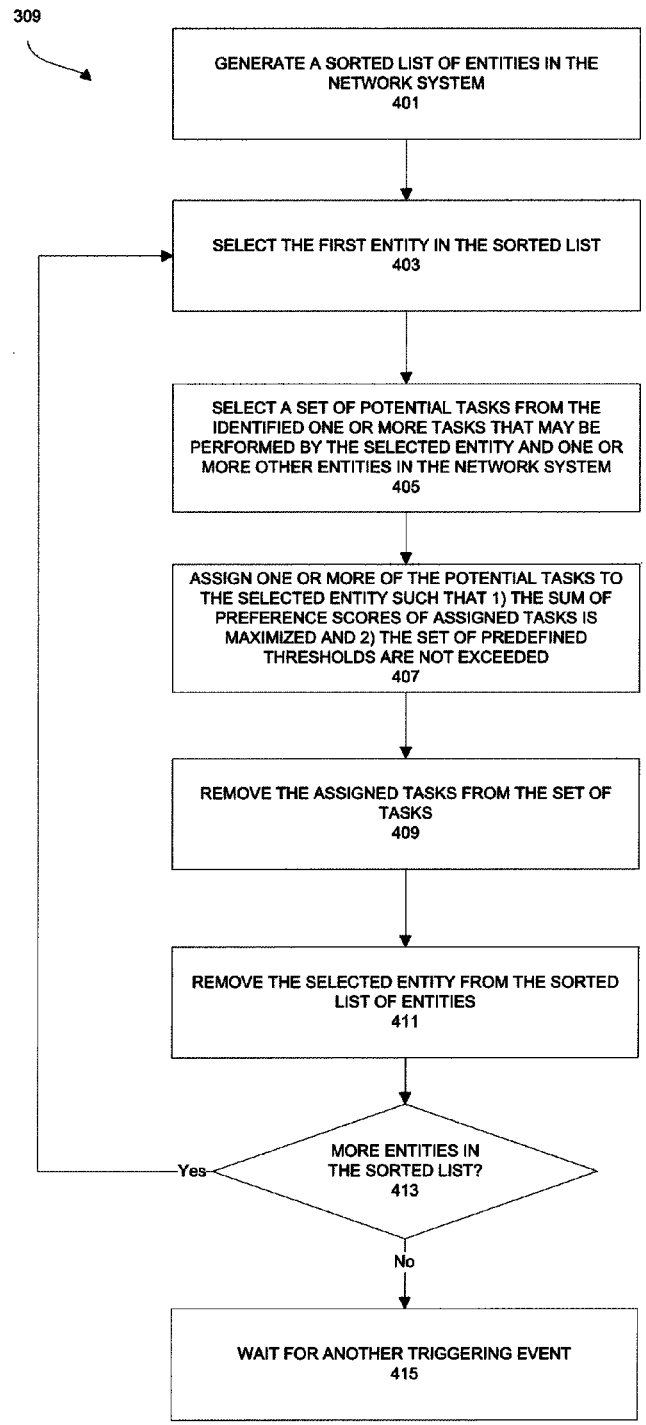
FIG. 4 shows an example approach for assigning each task to an entity in the network in accordance with one or more embodiments.

Following the determination of estimated loads L() and/or M(), operation 309 assigns each of the t tasks to an entity in the network system 100 based on the preference scores P( ) such that a set of predefined load thresholds are not exceeded. Operation 309 may be performed using various techniques and approaches. FIG. 4 shows an example approach for assigning each of the t tasks to an entity in the network system 100 according to one embodiment. The algorithm shown in FIG. 4 uses a mix of greedy solution along with a 0-1 Multi-constrained Knapsack approach to assign tasks.

In one embodiment, the operation 309 shown in FIG. 4 may commence at sub-operation 401 with the sorting of each entity in the network system 100 into a list. The list of entities may be sorted according to any characteristic or approach. For example, in one embodiment, the entities in the network system 100 may be sorted in descending order based on current memory and/or processor constraints (i.e., the most constrained entity in the network system 100 is at the top of the sorted list and the least constrained entity is at the bottom of the sorted list). In other embodiments, the list of entities may be sorted based on other factors, including the number of client devices 105 associated with each entity (e.g., entities in the list sorted in descending order based on the number of client devices 105 associated with each entity).

Following the creation and the sorting of the list of entities at sub-operation 401, sub-operation 403 selects the first or top entity in the sorted list. For example, the first entity may be the entity with the highest processor or memory load.

Following the selection of the first entity in the sorted list at sub-operation 403, sub-operation 405 selects a set of tasks from the t tasks identified at operation 303 that potentially may be performed by the selected first entity from the sorted list. For example, the selected first entity in the sorted list may be access point $101_2$ and the t tasks identified at operation 303 may include encryption/decryption tasks for client devices $105_1$-$105_P$. In this example, only the encryption/decryption tasks associated with the client devices $105_4$ and $105_5$ are selected as potential tasks for the access point $101_2$ since only the client devices $105_4$ and $105_5$ are associated with the access point $101_2$.

Following the selection of a set of potential tasks for the first entity in the sorted list, sub-operation 407 assigns one or more of the potential tasks to be performed by the first entity. In one embodiment, sub-operation 407 assigns tasks to the first entity to maximize the sum of preferences scores of corresponding tasks assigned to the first entity while not exceeding a predefined set of load thresholds (e.g., memory and processor loads) on the first entity. This may be represented as:

$\max \Sigma P(i,k) * T(k)$

Such That:

$\Sigma M(k) * T(k) \leq M_{total}(i)$ $\Sigma L(k) * T(k) \leq L_{total}(i)$ $T(k) = \{0,1\}$ In this formulation, $M_{total}(i)$ denotes a memory utilization threshold on the entity i and $L_{total}(i)$ denotes a processor utilization threshold on the entity i. For example, these thresholds $M_{total}(i)$ and $L_{total}(i)$ may represent total memory and processor resources available on the entity i. In some embodiments, the above formulation may be expanded to include other dependent or independent system constraints.

In one embodiment, the above formulation may be solved at sub-operation 407 using any technique. For example, a dynamic programming approach or a greedy approximation may be used to solve the above formulation.

Following assignment of one or more tasks to the selected first entity in the sorted list at sub-operation 407, sub-operation 409 removes the assigned tasks from the set of t tasks identified at operation 303. In the example provided above where the selected first entity in the sorted list is the access point $101_2$ and the potential tasks for the access point $101_2$ include encryption/decryption tasks for client devices $105_4$ and $105_5$, upon assigning one or more of these encryption/decryption tasks to the access point $101_2$, these assigned tasks may be removed from the set of t tasks identified at operation 303. Removing the tasks at sub-operation 409 ensures that the assigned tasks are not needlessly and erroneously considered for assignment to another entity in the network system 100.

At sub-operation 411, the selected first entity in the sorted list of entities is removed from the sorted list. For instance, in the example provided above, the access point $101_2$ would be removed from the sorted list. Removing the first entity from the sorted list ensures that tasks are not needlessly and erroneously considered for assignment to the already considered entity. Although described and shown in FIG. 4 as being performed subsequent to sub-operation 409, in other embodiments sub-operation 411 may be performed concurrently or before sub-operation 409.

Following removal of the previously selected first entity from the sorted list, sub-operation 413 determines whether any entities remain in the sorted list of entities. Upon determining at sub-operation 413 that one or more entities are in the sorted list, the method 300 moves to sub-operation 403 to select the new first entity in the sorted list. The newly selected first entity in the sorted list is thereafter processed according to sub-operations 405-411 in a similar manner as described above.

Upon determining at sub-operation 413 that no entities remain in the sorted list, the method 300 moves to sub-operation 415 to wait for another triggering event such that the method 300 may be performed again.

The embodiment of operation 309 described above provides a greedy solution along with a 0-1 Multi-constrained Knapsack approach to assign tasks. This approach provides an efficient solution to the assignment of tasks, which allows for great flexibility in the granularity level of task assignment.

Figure 5:
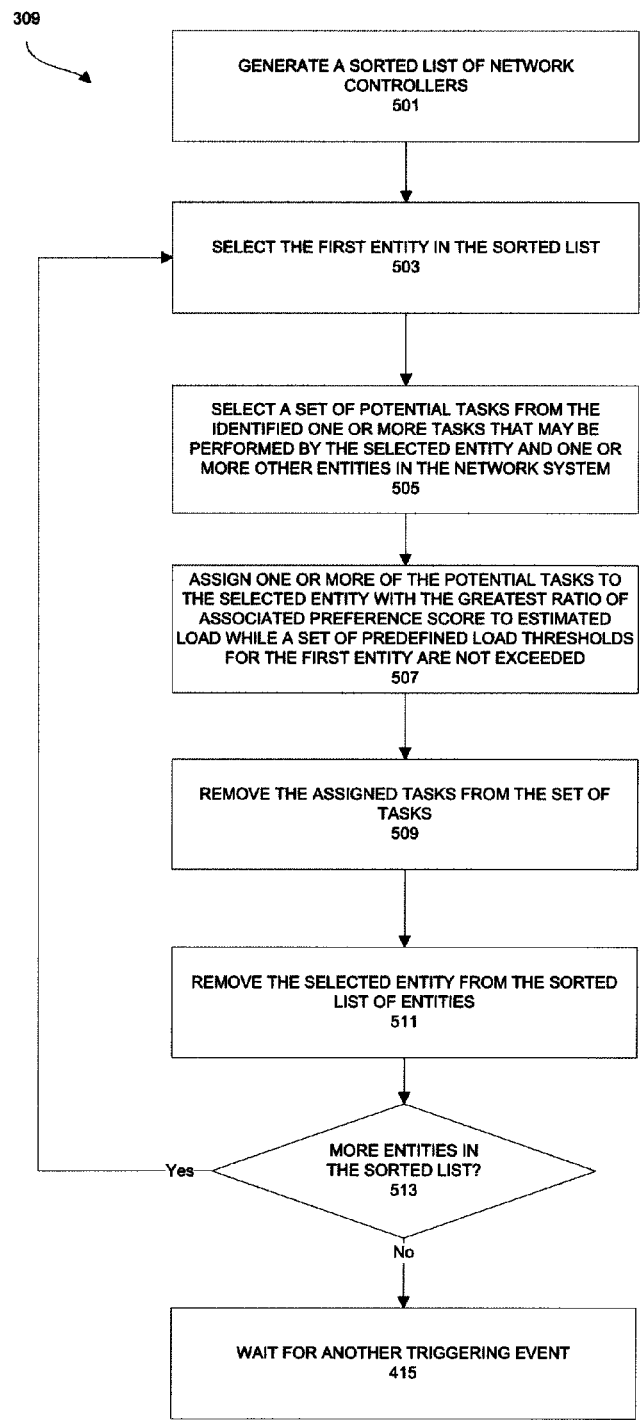
FIG. 5 shows another example approach for assigning each task to an entity in the network in accordance with one or more embodiments.

Turning now to FIG. 5, another example approach is provided for assigning each of the t tasks to an entity in the network system 100 according to one embodiment (i.e., operation 309). In contrast to the Knapsack approach used in FIG. 4, the approach in FIG. 5 assumes that the network controllers $103_1$-$103_M$ are the bottlenecks in the network system 100. Based on this assumption, the approach of FIG. 5 attempts to assign as many of the t tasks identified at operation 303 to the network controllers $103_1$-$103_M$ and assigns the remaining tasks to the access points $101_1$-$101_N$.

In one embodiment, the operation 309 shown in FIG. 5 may commence at sub-operation 501 with the sorting of each entity in the network system 100 into a list. The creation of a sorted list of entities may be performed at sub-operation 501 using similar factors as those described above in relation to sub-operation 401 shown in FIG. 4. In one embodiment, the network controllers $103_1$-$103_M$ may be sorted to the top of the sorted list and the access points $101_1$-$101_N$ may be sorted to the bottom of the sorted list. In other embodiments, the sorted list may only include the network controllers $103_1$-$103_M$. By pushing the network controllers $103_1$-$103_M$ to the top of the sorted list or including only the network controllers $103_1$-$103_M$, operation 309 of FIG. 5 may first process each of the network controllers $103_1$-$103_M$ before considering the access points $101_1$-$101_N$.

Following the creation and the sorting of the list of entities at sub-operation 501, sub-operation 503 selects the first or top entity in the sorted list. For example, the first entity may be the entity with the highest processor or memory load.

Following the selection of the first entity in the sorted list at sub-operation 503, sub-operation 505 selects a set of tasks from the t tasks identified at operation 303 that potentially may be performed by the selected first entity from the sorted list. In one embodiment, sub-operation 505 may be performed in a similar fashion as sub-operation 405 in FIG. 4.

Following the selection of a set of potential tasks for the first entity in the sorted list, sub-operation 507 assigns one or more of the potential tasks with the greatest preference score to load ratio to the first entity in the sorted list while not exceeding a predefined set of load thresholds (e.g., memory and processor loads) on the first entity. This list may be sorted sequentially in the order of:

$$\max \frac{P(i, k)}{\text{Load}}$$

Such that for all tasks k running on i, the following constraints are not violated:

$$\Sigma M(k)*T(k) \leq M_{total}(i)$$

$$\Sigma L(k)*T(k) \leq L_{total}(i)$$

$$T(k)=\{0,1\}$$

In this formulation the Load may be either memory utilization load M(k) and/or processor utilization load L(k). As described above, the sorted list may be top-loaded with the network controllers $103_1$-$103_M$ such that the t tasks may be assigned to the network controllers $103_1$-$103_M$ until capacity is reached on each of the network controllers $103_1$-$103_M$. Thereafter, the remaining tasks of the t tasks are assigned to the access points $101_1$-$101_N$.

Following assignment of one or more tasks to the selected first entity in the sorted list at sub-operation 507, sub-operation 509 may remove the assigned tasks from the set of t tasks identified at operation 303. In one embodiment, operation 509 may performed in a similar fashion to sub-operation 409 shown in FIG. 4.

At sub-operation 511, the selected first entity in the sorted list of entities is removed from the sorted list. In one embodiment, operation 511 may performed in a similar fashion to sub-operation 411 shown in FIG. 4. Although described and shown in FIG. 5 as being performed subsequent to sub-operation 509, in other embodiments sub-operation 511 may be performed concurrently or before sub-operation 509.

Following removal of the previously selected first entity from the sorted list, sub-operation 513 determines whether any entities remain in the sorted list of entities. Upon determining at sub-operation 513 that one or more entities remain in the sorted list, the method 300 moves to sub-operation 503 to select the new first entity in the sorted list. The newly selected first entity in the sorted list is thereafter processed according to sub-operations 505-511 in a similar manner as described above.

Upon determining at sub-operation 513 that no entities remain in the sorted list, the method 300 moves to sub-operation 515 to wait for another triggering event such that the method 300 may be performed again.

As described above, the method 300 may dynamically assign tasks at various granularity levels to different types, models, and/or classes of devices based on preferences to perform these tasks on each device and/or network/device conditions. This ability to dynamically assign processing of tasks between disparate devices in the network system 100 (e.g., assignment between the access points $101_1$-$101_N$ and the network controllers $103_1$-$103_M$) provides a more efficient network configuration and utilization of resources while not compromising throughput, overall network security, and/or network flexibility.

An embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components. Also, although the discussion focuses on uplink medium control with respect to frame aggregation, it is contemplated that control of other types of messages are applicable.

Any combination of the above features and functionalities may used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory Computer Readable Medium (CRM) comprising instructions which, when executed by one or more devices, cause the one or more devices to:
   identify a task to be performed by a device of a plurality of devices, the plurality of devices comprising an access point and a controller;
   determine a first preference score for the task to be performed by the access point and a second preference score for the task to be performed by the controller, wherein the access point comprises functionality to perform the task, and wherein the controller comprises functionality to perform the task;
   determine an estimated load on each of the access point and the controller to perform the task; and
   based at least on the first preference score and the second preference score and the estimated loads for the access point and the controller, select one of the access point and the controller to perform the task.

2. The non-transitory CRM of claim 1, wherein the first preference score is based in part on a current load of the access point and wherein the second preference score is based in part on a current load of the controller.

3. The non-transitory CRM of claim 2, wherein the current load on the access point and the current load on the controller include memory and processor utilization loads.

4. The non-transitory CRM of claim 2, wherein, to select one of the access point and the controller to perform the task, the instructions cause the one or more devices to:
   sort the access point and the controller in a list;
   assign the task to one of the access point and the controller with the greatest ratio of associated preference score to load with the task while a set of predefined load thresholds are not exceeded; and
   remove the assigned access point or assigned controller from the list after the task is assigned.

5. The non-transitory CRM of claim 1, wherein the task describes a class of operations, including one of 1) encryption and decryption operations, 2) Media Access Control Service Data Unit processing operations, and 3) multicast optimization operations.

6. The non-transitory CRM of claim 5, wherein the task is subdivided and assigned to either the access point or the controller based on one or more of 1) client identifiers, 2) Wi-Fi Multimedia (WMM) traffic type, 3) session identifiers, 4) application identifiers, 5) packet types, and 6) virtual access point identifiers.

7. The non-transitory CRM of claim 6, wherein the level of division of the task for assignment is based on processing constraints on the one or more devices and time constraints.

8. The non-transitory CRM of claim 1, wherein, to select one of the access point and the controller to perform the task, the instructions cause the one or more devices to:
   sort the access point and the controller into a list;
   select a component from the list;
   assign the task to the selected component such that a sum of preference scores of tasks assigned to the selected component is maximized while the load on the selected component does not exceed a set of predefined load thresholds; and
   remove the selected component from the list after assigning the task to the selected component.

9. The non-transitory CRM of claim 8, wherein the list is sorted based on one of 1) load on each of the access point and the controller, 2) type of the access point and the controller, and 3) a number of client devices associated with each of the access point and the controller.

10. The non-transitory CRM of claim 8, the instructions further cause the one or more devices to:
    detect a triggering event, wherein the identifying, determining, and selecting operations of the one or more devices are performed in response to detecting the triggering event,
    wherein the triggering event includes one or more of 1) detecting the load on one or more of the access point and the controller exceeds the set of predefined load thresholds and 2) detecting that network utilization is above a network utilization threshold.

11. A system comprising:
    a hardware processor; and
    a memory storing instructions that when executed by the hardware processor cause the hardware processor to:
    identify a task to be performed by a device of a plurality of devices, the plurality of devices comprising an access point and a controller;
    determine a first preference score for the task to be performed by the access point and a second preference score for the task to be performed by the controller, wherein the access point comprises functionality to perform the task, and wherein the controller comprises functionality to perform the task;

determine an estimated load on each of the access point and the controller to perform the task; and based at least on the first preference score and the second preference score and the estimated loads for the access point and the controller, select one of the access point and the controller to perform the task.

12. The system of claim 11, wherein the first preference score is based in part on a current load of the access point and wherein the second preference score is based in part on a current load of the controller.

13. The system of claim 12, wherein the current load on the access point and the current load on the controller include memory and processor utilization loads.

14. The system of claim 12, wherein, to select one of the access point and the controller to perform the task, the instructions cause the hardware processor to:

sort the access point and the controller into a list;

assign the task to one of the access point and the controller with the greatest ratio of associated preference score to load with the task while a set of predefined load thresholds are not exceeded; and remove the assigned access point or controller from the list after the task is assigned.

15. The system of claim 11, wherein the task describes a class of operations, including one of 1) encryption and decryption operations, 2) Media Access Control Service Data Unit processing operations, and 3) multicast optimization operations.

16. The system of claim 15, wherein the task is subdivided and assigned to either the access point or the controller based on one or more of 1) client identifiers, 2) Wi-Fi Multimedia (WMM) traffic type, 3) session identifiers, 4) application identifiers, 5) packet types, and 6) virtual access point identifiers.

17. The system of claim 16, wherein the level of division of the task for assignment is based on processing constraints on the one or more devices and time constraints.

18. The system of claim 11, wherein, to select one of the access point and the controller to perform the task, the instructions cause the hardware processor to:

sort the access point and the controller into a list;

select a component from the list;

assign the task to the selected component such that a sum of preference scores of tasks assigned to the selected component is maximized while the load on the selected component does not exceed a set of predefined load thresholds; and remove the selected component from the list after assigning the task to the selected component.

19. The system of claim 18, wherein the list is sorted based on one of 1) load on each of the access point and the controller, 2) type of the access point and the controller, and 3) a number of client devices associated with each of the access point and the controller.

20. The system of claim 18, the instructions further cause the hardware processor to:

detect a triggering event, wherein the identifying, determining, and selecting operations of the hardware processor are performed in response to detecting the triggering event, wherein the triggering event includes one or more of 1) detecting the load on one or more of the access point and the controller exceeds the set of predefined load thresholds and 2) detecting that network utilization is above a network utilization threshold.

* * * * *